(12) United States Patent
Bousfield et al.

(10) Patent No.: US 11,732,603 B2
(45) Date of Patent: *Aug. 22, 2023

(54) ICE CRYSTAL PROTECTION FOR A GAS TURBINE ENGINE (71) Applicant: ROLLS-ROYCE PLC, London (GB)

(72) Inventors: Ian J Bousfield, Nottingham (GB); Duncan A MacDougall, Derby (GB)

(73) Assignee: ROLLS-ROYCE plc, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/969,826

(22) Filed: Oct. 20, 2022

(65) Prior Publication Data
US 2023/0045400 A1 Feb. 9, 2023

Related U.S. Application Data (63) Continuation of application No. 17/235,234, filed on Apr. 20, 2021, now Pat. No. 11,512,607, which is a
(Continued)

(30) Foreign Application Priority Data

Feb. 26, 2019 (GB) ...................................... 1902549

(51) Int. Cl.
F01D 25/02 (2006.01)
F01D 5/14 (2006.01)
F04D 29/32 (2006.01)

(52) U.S. Cl.
CPC ............ F01D 25/02 (2013.01); F01D 5/141 (2013.01); F01D 5/147 (2013.01); F04D 29/324 (2013.01);
(Continued)

(58) Field of Classification Search
CPC .......... F01D 25/02; F01D 5/141; F01D 5/142; F01D 5/14; F01D 5/20; F01D 19/02;
(Continued)

(56) References Cited

U.S. PATENT DOCUMENTS 4,961,686 A 10/1990 Blair et al.
5,031,313 A 7/1991 Blair et al.
(Continued)

FOREIGN PATENT DOCUMENTS

EP 1 754 859 A2 2/2007

OTHER PUBLICATIONS

Grein, H. D. et al., "Inverse Auslegung Der Beschaufelung Eines Einstufigen Axialverdichters Mit Vorleitrad", MTZ—Motortechnische Zeitschrift, Springer, vol. 53, No. 4, pp. 182-188, Apr. 1, 1992.
(Continued)

Primary Examiner — Eric J Zamora Alvarez
(74) Attorney, Agent, or Firm — Oliff PLC (57) ABSTRACT A gas turbine engine includes a fan mounted to rotate about a main longitudinal axis; an engine core, including a compressor, a combustor, and turbine coupled to the compressor through a shaft, and reduction gearbox; wherein the compressor includes a plurality of stages, each stage including a respective rotor and stator, a first stage of the plurality of stages being arranged at an inlet and including a first rotor with a plurality of blades; each blade extending chordwise from a leading edge to a trailing edge, and from root to tip for a span height, wherein 0% of the span height corresponds to the root and 100% of span height corresponds to tip; wherein a ratio of a leading edge radius of each of the plurality of first rotor blades at 0% span height to a minimum leading edge radius is comprised between 1 and 1.50.

20 Claims, 4 Drawing Sheets

Related U.S. Application Data continuation of application No. 16/437,501, filed on Jun. 11, 2019, now Pat. No. 11,002,149.

(52) U.S. Cl.
CPC .... *F05D 2220/32* (2013.01); *F05D 2240/303* (2013.01); *F05D 2240/307* (2013.01)

(58) Field of Classification Search
CPC ........ F01D 5/147; F04D 29/324; F04D 29/32; F04D 29/321; F04D 29/38; F04D 29/384; F05D 2220/32; F05D 2220/3217; F05D 2300/512; F05D 2240/303; F05D 2240/307; F02C 7/36
See application file for complete search history.

(56) References Cited

U.S. PATENT DOCUMENTS

| | | |
|---|---|---|
| 6,457,938 B1 | 10/2002 | Liu et al. |
| 7,497,664 B2 | 3/2009 | Walter et al. |
| 9,416,677 B2 | 8/2016 | Munsell et al. |
| 2014/0283500 A1* | 9/2014 | Sabnis .................. F02K 1/52 60/226.1 |
| 2018/0231018 A1 | 8/2018 | Smith et al. |
| 2018/0231021 A1* | 8/2018 | Wilson .................. F01D 5/141 |
| 2018/0252166 A1 | 9/2018 | Pointon et al. |

OTHER PUBLICATIONS

May 25, 2020 Search Report issued in European Patent Application No. 20155604.0.

* cited by examiner

ICE CRYSTAL PROTECTION FOR A GAS TURBINE ENGINE

CROSS-REFERENCE TO RELATED APPLICATION(S)

This application is a continuation of U.S. application Ser. No. 17/235,234 filed Apr. 20, 2021, which is a continuation of U.S. application Ser. No. 16/437,501 filed Jun. 11, 2019, which is based on and claims priority under 35 U.S.C. 119 from Great Britain Patent Application No. 1902549.3 filed on Feb. 26, 2019. The entire contents of the above applications are incorporated herein by reference.

The present disclosure relates generally to gas turbine engines, and more specifically to arrangements for ice crystal protection for a gas turbine engine, in particular for a compressor of a gas turbine engine.

Gas turbine engines are used to power aircraft, watercraft, power generators, and the like. A gas turbine engine generally comprises, in axial flow series from front to aft, an air intake, a fan, one or more compressors, a combustor, one or more turbines, and an exhaust nozzle. Air entering the air intake is accelerated by the fan to produce two air flows: a first air flow (core engine flow) through an inlet duct into the compressor and a second air flow (bypass flow) which passes through a bypass duct to provide propulsive thrust. Air entering the compressor is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft.

The compressor may be a multi-stage compressor, wherein each compressor stage comprises in axial flow series a row of rotor blades and a row of stator vanes. A radially inner end of the rotor blades are connected to a hub that define an inner annulus. A casing circumscribes the rotor blades and the stator vanes and defines an outer annulus. The rotor blades each have a root and an aerofoil portion with a root, a tip, a trailing edge and a leading edge.

When operating in ice forming conditions (either super-cooled water ice or high altitude ice crystals), ice can accrete on vanes arranged in the core inlet upstream of the front of the compressor, for example on an Engine Section Stator (ESS) or core inlet stator, or on Inlet Guide Vanes (IGVs), either static or variable. When ice is shed from the vanes, which may be owing to aerodynamic loading or vibration, the ice is ingested by the compressor rotor blade stage immediately downstream. Depending on the size of the ice shed from the vanes, the ingested ice can damage the compressor rotor blades of the first stages, for example the first, second and even third stage.

Ice crystals and super-cooled water can also be ingested directly through the fan and travel along the inlet duct towards the compressor, impacting and potentially damaging the rotor blades of the first stages.

The ice threat can be significantly higher for geared turbofan architectures, as the fan rotates relatively slow making less likely that ice is centrifuged outward above the core into the bypass duct. Moreover, as the gas turbine engine gets bigger, the fan blade diameter increases and the gap between fan blades gets bigger, giving more of line-of-sight through the fan blades into the core. In other words, ice threat can increase considerably in medium- and large-size gas turbine engines.

Different approaches have been proposed to protect the engine against ice accretion. According to one of these approaches, anti-icing systems may be provided for the vanes to prevent ice build-up, and to melt any ice that accumulates. For example, the vanes may be provided with electrical heaters, or relatively hot air bled from the compressor may be directed towards the vanes. Both systems are complicated to implement and detrimental to efficiency.

Another known approach is that to make the rotor blade leading edge generally thicker, to withstand ice crystal impacts and reduce blade deflection. In this respect, the radius of curvature of the rotor blade at the leading edge is increased, but conventional design criteria applied to medium and large geared engines result in rotor blades not optimised in terms of weight and aerodynamic performance and efficiency, or in poor ice protection.

There is therefore a need for an improved system for ice crystal protection for a gas turbine engine.

According to a first aspect, there is provided a gas turbine engine comprising: a fan mounted to rotate about a main longitudinal axis; an engine core, comprising in axial flow series a compressor, a combustor, and a turbine coupled to the compressor through a shaft; a reduction gearbox that receives an input from the shaft and outputs drive to the fan so as to drive the fan at a lower rotational speed than the shaft. The compressor comprises a plurality of stages, each stage comprising a respective rotor and stator, a first stage of said plurality of stages being arranged at an inlet and comprising a first rotor with a plurality of first rotor blades, each blade extending chordwise from a leading edge to a trailing edge, and from a root to a tip for a span height H, wherein 0% of the span height H corresponds to the root and 100% of the span height H corresponds to the tip. The ratio of a maximum leading edge radius of curvature of the first rotor blades to a minimum leading edge radius of curvature of the first rotor blades is comprised between 2.2 and 3.5.

The ratio of the maximum leading edge radius of curvature to the minimum leading edge radius of curvature of the first rotor blades between 2.2 and 3.5 is relatively high compared to the blades of the first rotor in non-geared gas turbine engines. The present inventors have found that such a relatively high ratio is particularly effective against ice and at the same time does not penalise the blades of the first rotor in terms of weight and aerodynamic performance and efficiency as in the known blades.

In the known blades, as the ratio is relatively low, the minimum leading edge radius of curvature is relatively high compared to the maximum leading edge radius of curvature, which means that the blades are generally relatively thicker, therefore heavier and less performing and efficient.

On the contrary, the present inventors have found that it is not necessary to increase the leading edge radius of curvature along the whole blade, but it suffices to increase the leading edge radius of curvature in specific areas only to achieve an effective ice protection, without major penalties in terms of weight, performance and efficiency. Such specific areas may vary depending on the geometry of the inlet duct, but the ratio of the maximum leading edge radius of curvature to the minimum leading edge radius of curvature stays the same.

In other words, rather than making the whole leading edge thicker and therefore penalising blade performance and engine efficiency, ice protection can be achieved by selectively increasing the leading edge radius of curvature in a specific area where most likely ice would have the most negative impact, leaving the leading edge in remaining areas at a relatively small radiuses of curvature.

In substance, the present inventors have found that if the ratio of the maximum leading edge radius of curvature of the first rotor blades to the minimum leading edge radius of curvature of the first rotor blades is less than 2.2 and greater than 3.5, the blades can achieve neither satisfactory ice protection nor performance/efficiency at the same time.

Indeed, when the ratio is less than 2.2, if the minimum leading edge radius of curvature is kept relatively small to optimise performance, then the maximum leading edge radius of curvature is too small to provide adequate ice protection; on the contrary, if the maximum leading edge radius of curvature is optimised for ice protection, so it is relatively large, then the minimum leading edge radius of curvature gets relatively too large with a negative impact on performance/efficiency.

Analogously, when the ratio is greater than 3.5, if the minimum leading edge radius of curvature is kept relatively small to optimise performance, then the maximum leading edge radius of curvature gets unnecessarily too large with negative effects on weight and performance/efficiency); however, the minimum leading edge radius of curvature cannot be decreased below a safety level, resulting in a maximum leading edge radius of curvature still unnecessarily too large.

The disclosure may apply to blades with different leading edge cross-section. In embodiments, the first rotor blades may feature a circular or elliptical leading edge cross-section.

In embodiments of the disclosure, the ratio of the maximum leading edge radius of curvature of the first rotor blades to the minimum leading edge radius of curvature of the first blades may be equal or greater than 2.3, for example equal or greater than 2.4, or equal or greater than 2.5, or equal or greater than 2.6, or equal or greater than 2.7.

The ratio of the maximum leading edge radius of curvature of the first rotor blades to the minimum leading edge radius of curvature of the first blades may be equal or less than 3.4, for example equal or less than 3.3, or equal or less than 3.2, or equal or less than 3.1, or equal or less than 3.0.

The ratio of the maximum leading edge radius of curvature of the first rotor blades to the minimum leading edge radius of curvature of the first blades may be comprised between 2.2 and 3.5, for example between 2.2 and 3.3, or between 2.2 and 3.0, or between 2.3 and 3.5, or between 2.3 and 3.3, or between 2.3 and 3.0, or between 2.4 and 3.5, or between 2.4 and 3.3, or between 2.4 and 3.0, or between 2.5 and 3.5, or between 2.5 and 3.

The blades may comprise an aerofoil portion and a root, and a spanwise direction is a direction extending between the tip and the root of the blades, and a chordwise direction is a direction extending between the leading edge and the trailing edge of the blades.

In the present disclosure, upstream and downstream are with respect to the air flow through the compressor. Moreover, front and rear is with respect to the gas turbine engine, i.e. the fan being in the front and the turbine being in the rear of the engine.

In some embodiments the minimum leading edge radius of curvature may be positioned at between 0% and 50% of the span height H, for example between 20% and 40% of the span height H, or between 20% and 35% of the span height H, or between 25% and 35% of the span height H. In some embodiments the leading edge radius of curvature may be constant between 0% and 50% of the span height H and equal to the minimum leading edge radius of curvature. In other words, the leading edge radius of curvature may present a flat distribution between 0% and 50% of the span height H.

In some embodiments the maximum leading edge radius of curvature may be positioned at at least 60% of the span height H, for example at at least 70% of the span height H, or at at least 80% of the span height H. In some embodiments the maximum leading edge radius of curvature may be positioned at between 60% and 100% of the span height H, for example at between 70% and 100% of the span height H, or between 80% and 100% of the span height H.

In some embodiments the leading edge radius of curvature may vary at between 60% and 100% of the span height H and may be at least twice as large as the minimum leading edge radius of curvature.

In some embodiments the leading edge radius of curvature between 85% and 100%, or between 90% and 100%, of the span height H may be constant. For example the leading edge radius of curvature between 85% and 100%, or between 90% and 100%, of the span height H may be constant and equal to the maximum leading edge radius of curvature.

In some embodiments the ratio of the leading edge radius of curvature at 0% of the span height H to the minimum leading edge radius of curvature may be equal or greater than 1, for example equal or greater than 1.10, or equal or greater than 1.15, or equal or greater than 1.20. In some embodiments the ratio of the leading edge radius of curvature at 0% of the span height H to the minimum leading edge radius of curvature may be equal or less than 1.50, for example equal or less than 1.45, or equal or less than 1.40, or equal or less than 1.35. In some embodiments the ratio of the leading edge radius of curvature at 0% of the span height H to the minimum leading edge radius of curvature may be comprised between 1 and 1.50, for example between 1 and 1.40, or between 1 and 1.35, or between 1 and 1.30, or between 1 and 1.25, or between 1 and 1.20, or between 1.10 and 1.40, or between 1.10 and 1.35, or between 1.15 and 1.50, or between 1.15 and 1.40, or between 1.15 and 1.35, or between 1.20 and 1.50, or between 1.20 and 1.45, or between 1.20 and 1.40, or between 1.20 and 1.35.

In some embodiments a ratio of the maximum leading edge radius of curvature to the leading edge radius of curvature at 0% of the span height H may be equal or higher than 1.7, for example equal or greater than 1.8, or equal or greater than 1.9, or equal or greater than 2.0, or equal or greater than 2.1, or equal or greater than 2.2, or equal or greater than 2.3. In some embodiments the ratio of the maximum leading edge radius of curvature to the leading edge radius of curvature at 0% of the span height H may be equal or less than 3.2, for example equal or less than 3.1, or equal or less than 3.0, or equal or less than 2.9, or equal or less than 2.8, or equal or less than 2.7. In some embodiments the ratio of the maximum leading edge radius of curvature to the leading edge radius of curvature at 0% of the span height H may be comprised between 1.7 and 3.2, for example between 1.7 and 3.0, or between 1.7 and 2.7, or between 2.0 and 3.2, or between 2.0 and 3.0, or between 2.0 and 2.7, or between 2.3 and 3.2, or between 2.3 and 3.0 or between 2.3 and 2.7.

In some embodiments, the leading edge radius of curvature may decrease linearly from 80% span height to 40% span height, for example from 75% to 40% span height, or from 70% to 40% span height, or from 65% to 40% span height, or from 80% to 45% span height, or from 80% to 50% span height, or from 75% to 45% span height, or from 70% to 45% span height, or from 65% to 45% span height.

In some embodiments the leading edge radius of curvature may decrease linearly from 80% span height to 55% span height and the leading edge radius of curvature may be constant and equal to the minimum leading edge radius of curvature between 50% span height and 0% span height.

As previously stated, aspects of some embodiments may be advantageous for medium- and large-size gas turbine engines. In some embodiments the fan may have a diameter equal or greater than 240 cm, for example equal or greater than 300 cm, or equal or greater than 350 cm, and the ratio of the maximum leading edge radius of curvature to the fan diameter may be equal or greater than $1.4 \times 10^{-4}$, for example equal or greater than $1.5 \times 10^{-4}$, or equal or greater than $1.6 \times 10^{-4}$, or equal or greater than $1.7 \times 10^{-4}$.

In some embodiments the fan may have a diameter equal or less than 390 cm, for example equal or less than 370 cm, or equal or greater than 350 cm, and the ratio of the maximum leading edge radius of curvature to the fan diameter may be equal or less than $3.6 \times 10^{-4}$, for example equal or greater than $3.1 \times 10^{-4}$, or equal or greater than $2.6 \times 10^{-4}$, or equal or greater than $2.1 \times 10^{-4}$.

In some embodiments the fan may have a diameter comprised between 240 cm and 400 cm, for example between 240 cm and 360 cm, or between 280 cm and 400 cm, or between 280 cm and 360 cm, or between 320 cm and 400 cm, or between 320 cm and 360 cm, and the ratio of the maximum leading edge radius of curvature to the fan diameter may be comprised between $1.4 \times 10^{-4}$ and $3.6 \times 10^{-4}$, for example between $1.4 \times 10^{-4}$ and $3.0 \times 10^{-4}$, or between $1.5 \times 10^{-4}$ and $3.6 \times 10^{-4}$, or between $1.5 \times 10^{-4}$ and $3.0 \times 10^{-4}$, or between $1.5 \times 10^{-4}$ and $2.5 \times 10^{-4}$.

In some embodiments, the maximum leading edge radius of curvature may be equal or greater than 0.4 mm, for example equal or greater than 0.5 mm, or equal or greater than 0.6 mm. The maximum leading edge radius of curvature may be equal or less than 0.9 mm, for example equal or less than 0.8 mm, or equal or less than 0.7 mm. The maximum leading edge radius of curvature may be comprised between 0.4 mm and 0.9 mm, for example between 0.4 mm and 0.8 mm, or between 0.5 mm and 0.9 mm, or between 0.5 mm and 0.8 mm, or between 0.6 mm and 0.9 mm, or between 0.6 mm and 0.8 mm.

In some embodiments the minimum leading edge radius of curvature may be equal or less than 0.40 mm, for example equal or less than 0.35 mm, or equal or less than 0.30 mm. The minimum leading edge radius of curvature may be equal or greater than 0.16 mm, for example equal or greater than 0.18 mm, or equal or greater than 0.20 mm, or equal or greater than 0.22 mm. The minimum leading edge radius of curvature may be comprised between 0.16 mm and 0.40 mm, for example between 0.16 mm and 0.35 mm, or between 0.16 mm and 0.30 mm, or between 0.18 mm and 0.40 mm, or between 0.18 mm and 0.35 mm, or between 0.18 mm and 0.30 mm, or between 0.20 mm and 0.40 mm, or between 0.20 mm and 0.35, or between 0.20 mm and 0.30 mm, or 0.22 mm and 0.30 mm.

In some embodiments the fan may rotate at cruise conditions at a speed between 1300 rpm and 2000 rpm, for example between 1300 rpm and 1900 rpm, or between 1400 rpm and 1800 rpm, or between 1500 rpm and 1700 rpm.

In some embodiments the fan may comprise 16 to 24 fan blades, for example 16 to 22 fan blades, or 16 to 20 fan blades, or 18 to 22 fan blades.

The compressor may comprise two or more stages. For example, the compressor may comprise three or four stages. The compressor may comprise less than twelve stages, for example less than eleven, or ten stages.

In come embodiments, the compressor may comprise 2 to 8 stages.

The compressor may be an intermediate pressure compressor and the gas turbine engine may further comprise a high pressure compressor downstream of the intermediate pressure compressor.

The turbine may be an intermediate pressure turbine and the gas turbine engine may further comprise a high pressure turbine upstream of the intermediate pressure compressor.

The shaft may be a first shaft and the gas turbine engine may further comprise a second shaft coupling the high pressure turbine to the high pressure compressor.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 Nkg$^{-1}$s to 100 Nkg$^{-1}$s, or 85 Nkg$^{-1}$s to 95 Nkg$^{-1}$s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 1100 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
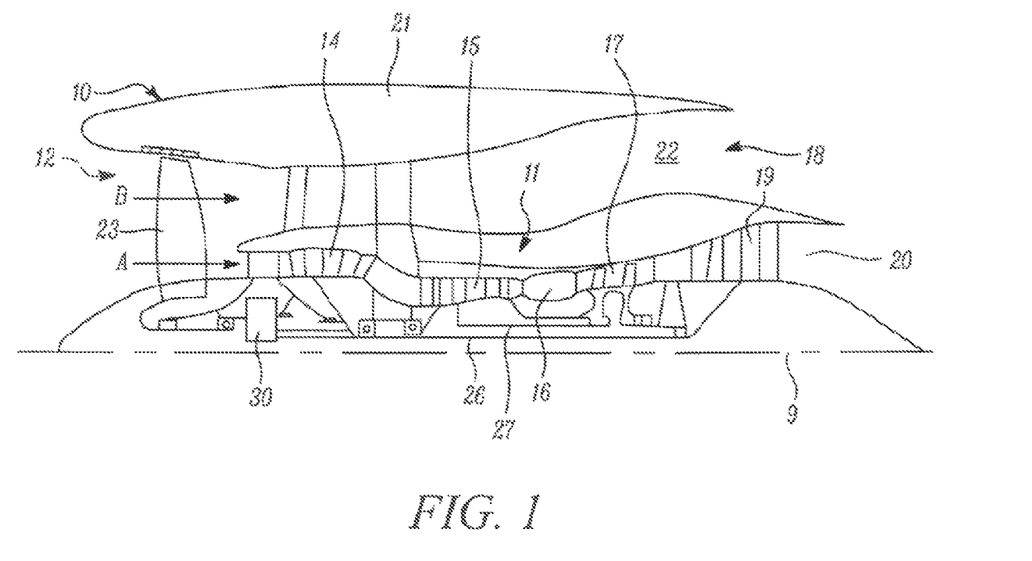
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high-pressure turbine 17, a low pressure turbine 19 and a core exhaust nozzle 20.

Figure 2:
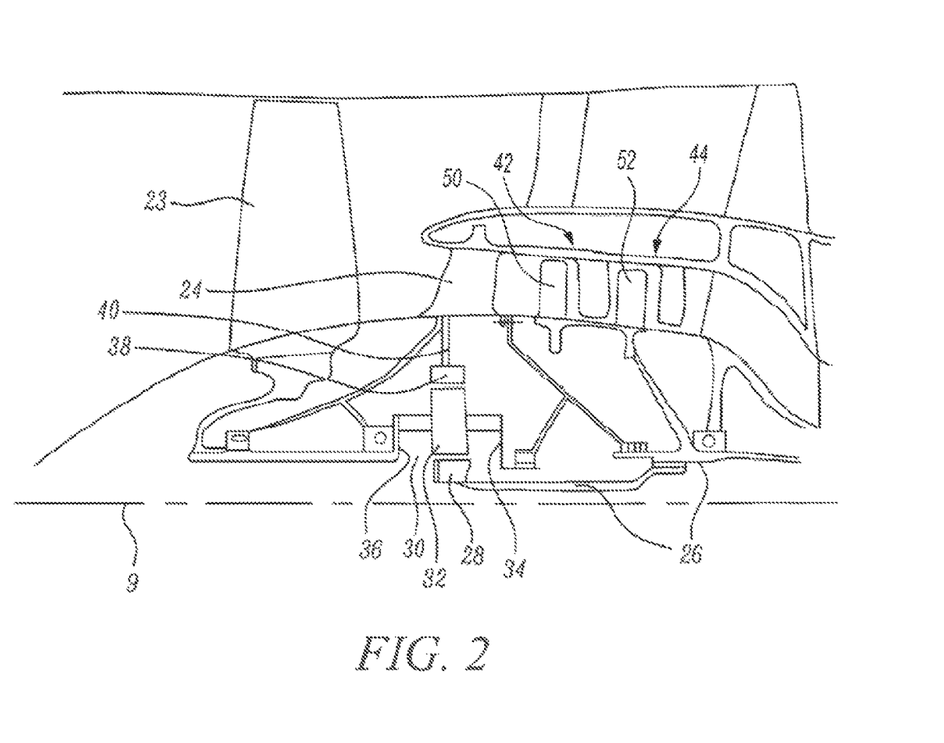
FIG. 2 is a close up sectional side view of an upstream portion of a gas turbine engine.

The low pressure compressor 14 and the high pressure compressor 15 comprise respective pluralities of compressor stages, each stage comprising a rotor and a stator. FIG. 2 shows a first stage 42 and a second stage 44 of the low pressure compressor 14. The first stage 42 is arranged upstream of the second stage 44. The first stage 42 comprises a first rotor with a row of first rotor blades 50 and, downstream thereof, a first stator with a row of first stator vanes 52. Although the low pressure compressor 14 has been illustrated as comprising two stages, as noted elsewhere herein, the low pressure compressor 14 may comprise a different number of stages, for example two to eight stages.

A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
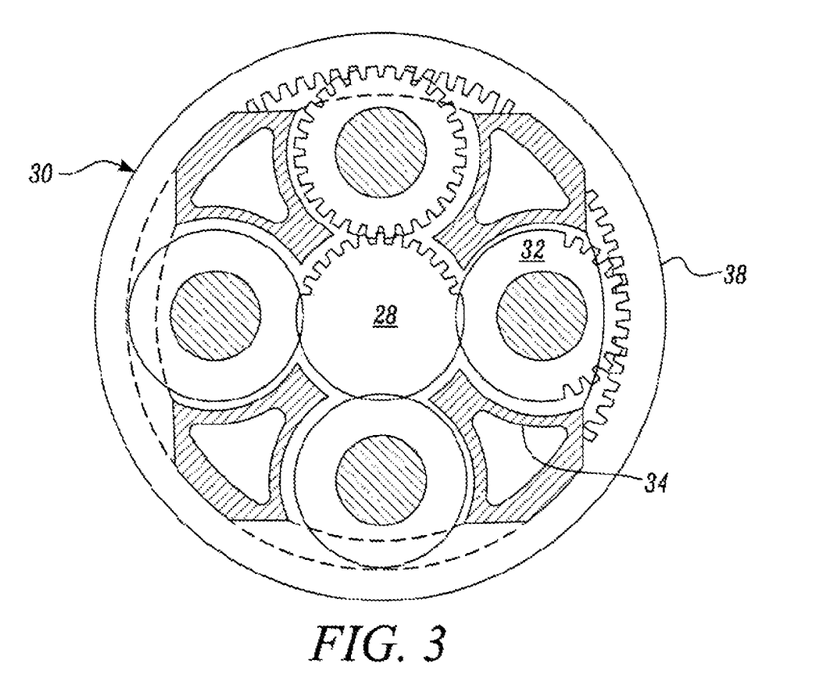
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
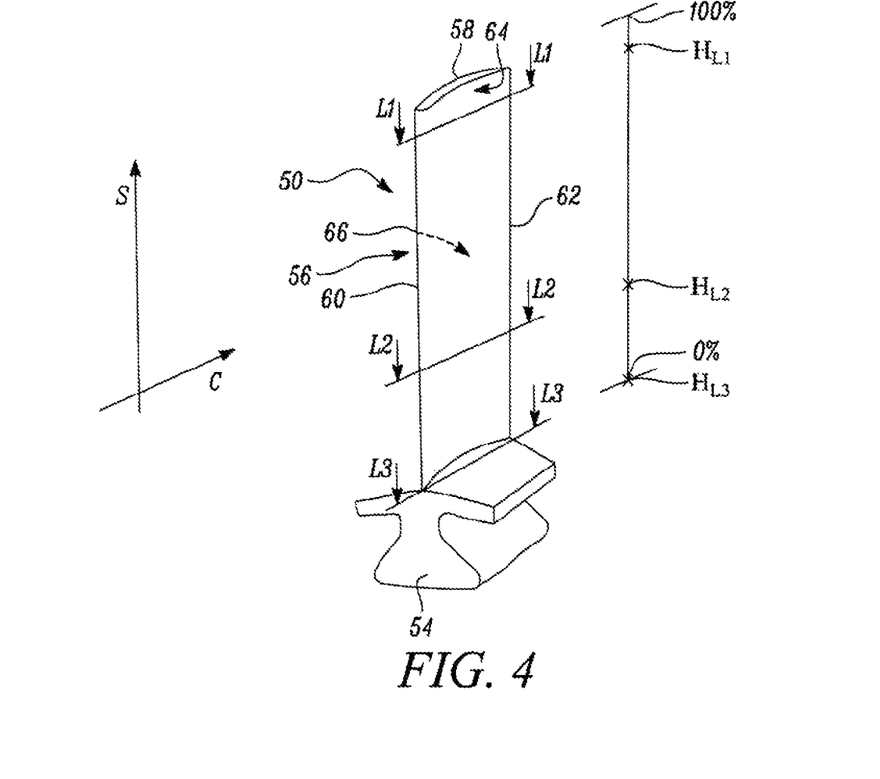
FIG. 4 shows a first rotor blade of a compressor.

FIG. 4 illustrates an exemplary first rotor blade 50 comprising a root 54 and an aerofoil portion 56. The root 54 may have any suitable shape adapted to be mounted on a disc (not illustrated). The aerofoil portion 56 comprises a tip 58, opposite to the root 54, and a leading edge 60 and a trailing edge 62. The aerofoil portion 56 further comprises a pressure surface wall 64 extending from the leading edge 60 to the trailing edge 62 and a suction surface wall 66 extending from the leading edge 60 to the trailing edge 62.

The aerofoil portion 56 extends along a spanwise direction S between the root 54 and the tip 58 for a span height H. and along a chordwise direction C between the leading edge 60 and the trailing edge 62.

The first rotor blade 50 may have a span height H comprised between 140 mm and 220 mm and a true chord comprised between 80 mm and 160 mm.

The leading edge 60 features a leading edge radius of curvature variable along the spanwise direction S. In other words, from the root 54, which may be considered at 0% of the span height H, to the tip 58, which may be considered at 100% of the span height H, the leading edge radius of curvature varies as it will now be described in more detail with reference to FIGS. 5-7.

Figure 5:
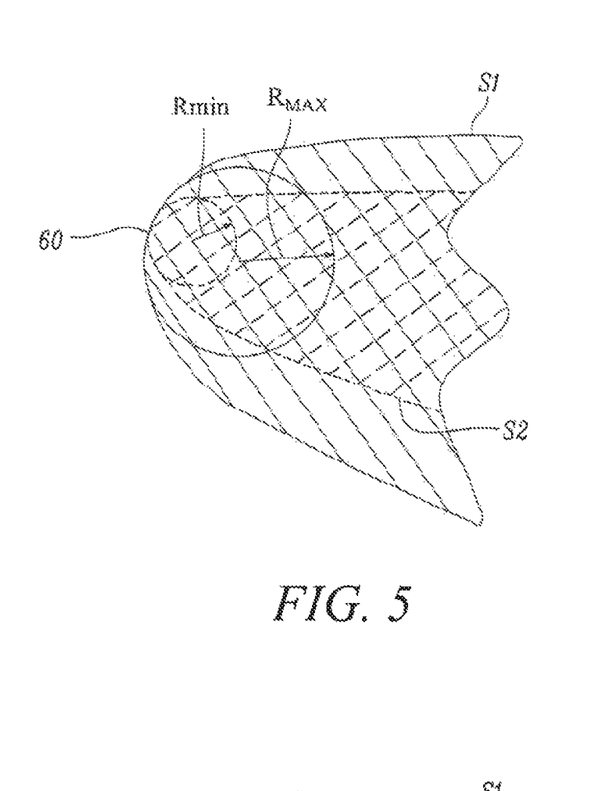
FIG. 5 is a partial schematic view, in cross-section, of the first rotor blade of FIG. 4 illustrating the difference between a maximum and a minimum leading edge radius of curvature.

FIG. 5 shows two different transversal sections of the first rotor blade 50 showing the radius of curvature of the leading edge 60 at different span heights. In detail, FIG. 5 shows a first section S1 taken along line L1-L1 of FIG. 4 and containing the maximum leading edge radius of curvature $R_{MAX}$ and a second section S2 taken along line L2-L2 of FIG. 4 and containing the minimum leading edge radius of curvature $R_{min}$.

It is to be noted that the leading edge 60 may not lay on a single radial direction and the leading edge 60 at the first section S1 and at second section S2 may not be aligned along the same radial direction; thus the leading edge 60 at the first section S1 and at second section S2 are illustrated in FIG. 5 as coincident for sake of clarity only. In other words, the blade 50 may have any suitable shape and the leading edge 60 may extend along any suitable direction.

The first section S1 is taken at a span height $H_{L1}$ corresponding to 90% of the span height H. In other words, the maximum leading edge radius of curvature $R_{MAX}$ is arranged at 90% of the span height H. In other non-illustrated embodiments the maximum leading edge radius of curvature $R_{MAX}$ may be arranged at different span heights, for example in a range between 60% and 100%, or 80% and 100% of the span height H.

The second section S2 is taken at a span height $H_{L2}$ corresponding to 30% of the span height H. In other words, the minimum leading edge radius of curvature $R_{min}$ is arranged at 30% of the span height H. In other non-illustrated embodiments the minimum leading edge radius of curvature $R_{min}$ may be arranged at different span heights, for example in a range between 20% and 40% of the span height H.

The ratio of the maximum leading edge radius of curvature $R_{MAX}$ to the minimum leading edge radius of curvature $R_{min}$ may be equal or greater than 2.2. Moreover, the ratio of the maximum leading edge radius of curvature $R_{MAX}$ to the minimum leading edge radius of curvature $R_{min}$ may be equal or less than 3.5. In an embodiment, the ratio of the maximum leading edge radius of curvature $R_{MAX}$ to the minimum leading edge radius of curvature $R_{min}$ may be 3.0.

Figure 6:
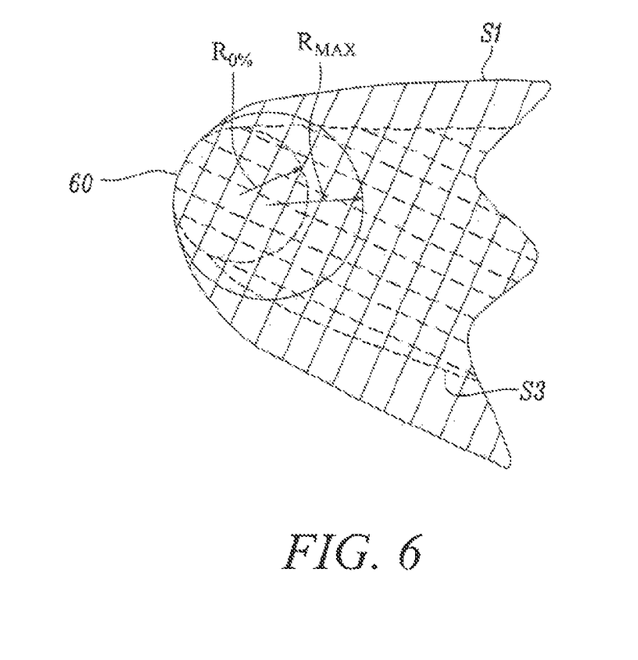
FIG. 6 is a partial schematic view, in cross-section, of the first rotor blade of FIG. 4 illustrating the difference between the maximum leading edge radius of curvature and the leading edge radius of curvature at 0% span height.

FIG. 6 shows the first section S1 of FIG. 5 containing the maximum leading edge radius of curvature $R_{MAX}$ and a third section S3 taken along line L3-L3 of FIG. 4 at a span height $H_{L3}$ corresponding to 0% of the span height H. The leading edge radius of curvature at the span height $H_{L3}$ is $R_{0\%}$.

As in FIG. 5, the maximum leading edge radius of curvature $R_{MAX}$ and the leading edge radius of curvature $R_{0\%}$ may not necessarily be aligned along one radial direction and are illustrated as coincident for sake of clarity only.

The ratio of the maximum leading edge radius of curvature $R_{MAX}$ to the leading edge radius of curvature $R_{0\%}$ may be equal or greater than 1.7. Moreover, the ratio of maximum leading edge radius of curvature $R_{MAX}$ to the minimum leading edge radius of curvature $R_{min}$ may be less than 3.2. In an embodiment, the ratio of maximum leading edge radius of curvature $R_{MAX}$ to the minimum leading edge radius of curvature $R_{min}$ may be 2.4.

Figure 7:
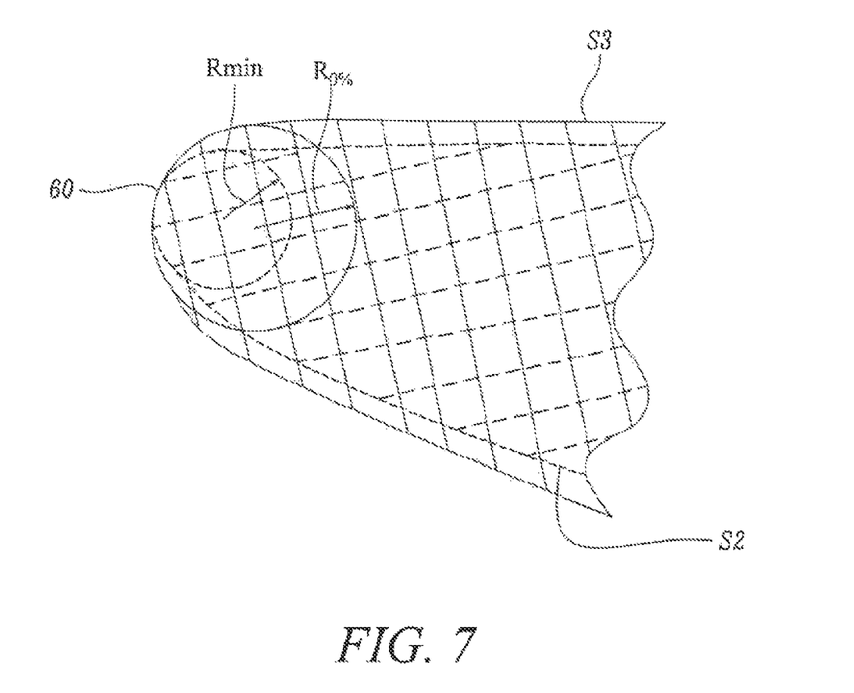
FIG. 7 is a partial schematic view, in cross-section, of the first rotor blade of FIG. 4 illustrating the difference between the minimum leading edge radius of curvature and the leading edge radius of curvature at 0% span height.

FIG. 7 shows the second section S2 containing the minimum leading edge radius of curvature $R_{min}$, and the third section S3 containing the leading edge radius of curvature $R_{0\%}$ at a span height of 0%.

The ratio of the leading edge radius of curvature $R_{0\%}$ to the minimum leading edge radius of curvature $R_{min}$ may be equal or greater than 1.1. Moreover, the ratio of the leading edge radius of curvature $R_{0\%}$ to the minimum leading edge radius of curvature $R_{min}$ may be less than 1.4. In an embodiment, the ratio of the leading edge radius of curvature $R_{0\%}$ to the minimum leading edge radius of curvature $R_{min}$ may be 1.25.

As illustrated, the leading edge radius of curvature varies along the span, decreasing from a maximum value at 80%-100% span height to a minimum value at 20%-40% span height, and then increasing again from the minimum value to the 0% span height value.

In non-illustrated embodiments the leading edge radius of curvature $R_{0\%}$ may be equal to the minimum leading edge radius of curvature $R_{min}$, or in other words their ratio may be equal to 1. For example, the leading edge radius of curvature may be constant and equal to the minimum leading edge radius of curvature $R_{min}$ between 0% and 50% of the span height H.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising:
a fan mounted to rotate about a main longitudinal axis; and
an engine core comprising in axial flow series a compressor, a combustor, and a turbine coupled to the compressor through a shaft; wherein
the compressor comprises a plurality of stages, each stage comprising a respective rotor and stator, a first stage of said plurality of stages being arranged at an inlet and comprising a first rotor with a plurality of first rotor blades,
each of the plurality of first rotor blades extends chordwise from a leading edge to a trailing edge,
a ratio of a maximum leading edge radius of each of the plurality of first rotor blades to a fan diameter is comprised between $1.4 \times 10^{-4}$ and $3.6 \times 10^{-4}$, the maximum leading edge radius of each of the plurality of first rotor blades being the maximum radius that is defined by the leading edge in circumferential cross-section, and
the fan diameter is greater than 220 cm, or greater than 230 cm, or greater than 240 cm.

2. The gas turbine engine according to claim 1, wherein the ratio of the maximum leading edge radius of each of the plurality of first rotor blades to the fan diameter is equal to or greater than $1.5 \times 10^{-4}$, or equal to or greater than $1.6 \times 10^{-4}$, or equal to or greater than $1.7 \times 10^{-4}$, or equal to or greater than $2.1 \times 10^{-4}$.

3. The gas turbine engine according to claim 1, wherein the fan diameter is less than 390 cm, or less than 370 cm.

4. The gas turbine engine according to claim 1, wherein the fan diameter is in a range from 330 cm to 380 cm.

5. The gas turbine engine according to claim 1, wherein the fan diameter is in a range from 240 cm to 280 cm.

6. The gas turbine engine according to claim 1, wherein the fan diameter is greater than 300 cm, and the ratio of the maximum leading edge radius to the fan diameter is greater than $1.7 \times 10^{-4}$.

7. The gas turbine engine according to claim 1, wherein the maximum leading edge radius is comprised between 0.4 mm and 0.9 mm.

8. The gas turbine engine according to claim 1, further comprising a reduction gearbox that receives an input from the shaft and outputs drive to the fan so as to drive the fan at a lower rotational speed than the shaft.

9. The gas turbine engine according to claim 1, wherein each of the plurality of first rotor blades has a circular or elliptical leading edge cross-section.

10. The gas turbine engine according to claim 1, wherein the fan comprises 16 to 24 fan blades.

11. The gas turbine engine according to claim 1, wherein the compressor comprises 2 to 8 stages.

12. The gas turbine engine according to claim 1, wherein
the compressor is an intermediate pressure compressor, the gas turbine engine further comprising a high pressure compressor downstream of the intermediate pressure compressor,
the turbine is an intermediate pressure turbine, the gas turbine engine further comprising a high pressure turbine upstream of the intermediate pressure turbine, and
the shaft is a first shaft, the gas turbine engine further comprising a second shaft coupling the high pressure turbine to the high pressure compressor.

13. A gas turbine engine comprising:
a fan mounted to rotate about a main longitudinal axis;
an engine core comprising in axial flow series a compressor, a combustor, and a turbine coupled to the compressor through a shaft; and a reduction gearbox that receives an input from the shaft and outputs drive to the fan so as to drive the fan at a lower rotational speed than the shaft, wherein the compressor comprises a plurality of stages, each stage comprising a respective rotor and stator, a first stage of said plurality of stages being arranged at an inlet and comprising a first rotor with a plurality of first rotor blades, each of the plurality of first rotor blades extends chordwise from a leading edge to a trailing edge, and from a root to a tip for a span height H, wherein 0% of the span height H corresponds to the root and 100% of the span height H corresponds to the tip, a leading edge radius of each of the plurality of first rotor blades varies between 60% and 100% of the span height H, and the leading edge radius of each of the plurality of first rotor blades between 60% and 100% of the span height H is at least twice as large as a minimum leading edge radius of each of the plurality of first rotor blades, and the leading edge radius is the radius that is defined by the leading edge in circumferential cross-section, and the minimum leading edge radius is the minimum radius that is defined by the leading edge in circumferential cross-section.

14. The gas turbine engine according to claim 13, wherein the compressor comprises three or four stages.

15. The gas turbine engine according to claim 13, wherein the reduction gearbox has a reduction ratio in a range from 3 to 4.2.

16. The gas turbine engine according to claim 13, wherein the leading edge radius is constant between 85% and 100% of the span height H.

17. The gas turbine engine according to claim 13, wherein the leading edge radius is constant between 0% and 50% of the span height H.

18. The gas turbine engine according to claim 13, wherein a maximum leading edge radius is comprised between 0.4 mm and 0.9 mm.

19. The gas turbine engine according to claim 13, wherein a ratio of a maximum leading edge radius of each of the plurality of first rotor blades to a fan diameter is comprised between $1.4 \times 10^{-4}$ and $3.6 \times 10^{-4}$, the maximum leading edge radius of each of the plurality of first rotor blades being the maximum radius that is defined by the leading edge in circumferential cross-section.

20. A gas turbine engine comprising:

a fan mounted to rotate about a main longitudinal axis; and an engine core comprising in axial flow series a compressor, a combustor, and a turbine coupled to the compressor through a shaft; wherein the compressor comprises a plurality of stages, each stage comprising a respective rotor and stator, a first stage of said plurality of stages being arranged at an inlet and comprising a first rotor with a plurality of first rotor blades, each of the plurality of first rotor blades extends chordwise from a leading edge to a trailing edge, a ratio of a maximum leading edge radius of each of the plurality of first rotor blades to a fan diameter is comprised between $1.4 \times 10^{-4}$ and $3.6 \times 10^{-4}$, the maximum leading edge radius of each of the plurality of first rotor blades being the maximum radius that is defined by the leading edge in circumferential cross-section, and the maximum leading edge radius is comprised between 0.4 mm and 0.9 mm.

* * * * *